July 28, 1959     J. F. JUMBA     2,896,667
DAMPENER FOR PIPE LINES
Filed July 27, 1956
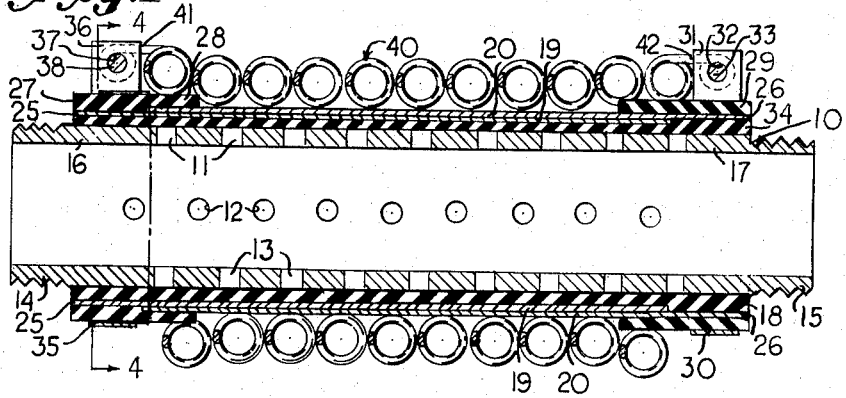
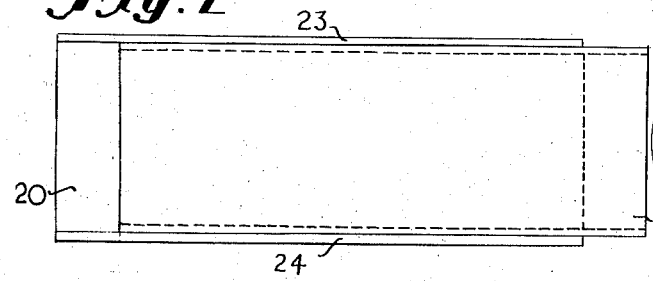
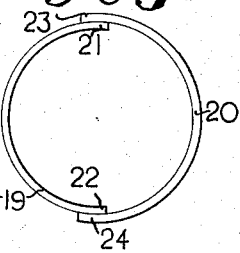
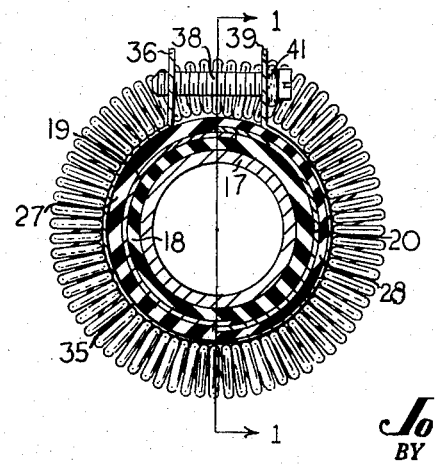
INVENTOR.
Joseph F. Jumba
BY
Attorney

2,896,667
DAMPENER FOR PIPE LINES

Joseph F. Jumba, Pittsburgh, Pa., assignor to Westinghouse Air Brake Company, Wilmerding, Pa., a corporation of Pennsylvania Application July 27, 1956, Serial No. 600,613

3 Claims. (Cl. 138—30)

This invention relates to devices for dampening, absorbing, or suppressing undesired pressure pulsations or surges in fluid systems, and more particularly to devices of the type employing a mandrel or perforated pipe section and resilient means associated therewith for providing a volume which varies as a result of pressure variations, and which is adapted to be connected in circuit with conduits or pipe lines carrying a fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low cycle or low frequency surges of high volume or intensity; centrifugal and rotary pumps may have in their fluid outputs low volume surges occurring at a high frequency. In addition to these periodic surges, shock waves may be generated in any fluid flow system where the fluid is subject to sudden deceleration, such for example as that caused by closing a valve against the moving column of fluid. The closing of such a valve may result in the generation of surges or shock waves of high intensity, which may result in damaged pipe lines and in undesirable noises frequently known as "water hammer."

It is old in the art to suppress and dampen these surges and shock waves by connecting in the fluid line a mandrel or section of pipe having therein a number of perforations or throttling orifices, this mandrel or perforated section of pipe being surrounded by a resilient sleeve of rubber or other suitable resilient material. Sudden increases of pressure in the fluid in the line cause the fluid to flow through the perforations or throttling orifices into the volume between the sleeve and the line or mandrel, expanding the sleeve and thereby taking up or absorbing the excess pressure. When the pressure in the line returns to normal after the surge has passed the sleeve contracts, and the fluid between the sleeve and the line is discharged through the openings or perforations back into the line.

A number of prior art devices provide housing means for enclosing the resilient sleeve and forming a chamber around the resilient sleeve, into which chamber there is introduced or installed a resilient material such as compressed air or sponge rubber, the resilient material in the chamber exerting pressure on the outside of the sleeve and acting to insure the rapid contraction or collapse of the sleeve, or return to its former position, and discharge of fluid back into the line, when the line pressure falls to normal or below after the surge has past.

In one prior art device, disclosed in the application of Wallace F. Poore for Dampener for Pipe Lines, Serial No. 580,361, filed April 24, 1956, now Patent No. 2,828,771, and assigned to the assignee of the instant application, the resilient material outside of the sleeve is replaced by a coiled helical spring further coiled in the form of a large helix around the outside of the sleeve.

This invention is an improvement upon the apparatus disclosed in the above identified application. In this improved dampener device, there is interposed between the spring and the resilient sleeve means for preventing the sleeve from becoming damaged by contact with the coiled spring. In the preferred embodiment of the instant invention, this interposed means consists of a pair of substantially semi-cylindrical shield members disposed around the outer surface of the resilient sleeve with the adjacent edges of the two shield members overlapping each other.

Accordingly, it is a primary object of the invention to provide new and improved surge dampening apparatus.

Another object of the invention is to provide new and improved surge dampening apparatus in which the necessity for an enclosed chamber around the outside of a resilient sleeve member is avoided.

A further object of the invention is to provide new and improved surge dampening apparatus of the type having a coiled helical spring further coiled in the form of a helix around the outside of a resilient sleeve in which means is provided interposed between the sleeve and the coiled spring for preventing damage to the sleeve by contact with the spring.

Other objects and advantages will become apparent after a perusal of the following specification when studied in connection with the accompanying drawings, in which:

Fig. 1 is a longitudinal cross-sectional view of apparatus constructed according to the preferred embodiment of the invention, taken in a plane substantially through the longitudinal axis;

Fig. 2 is a side-elevational view of the damage-preventing semi-cylindrical shield members of Fig. 1, reversed 180 degrees from their positions in Fig. 1;

Fig. 3 is an end view of the protective semi-cylindrical shields of the invention, showing the manner in which the edges of the shields overlap; and Fig. 4 is a cross-sectional view in two parallel planes transverse to the plane of Fig. 1, taken along the line 4—4 of Fig. 1.

Referring now to the drawings, in which like reference characters are used throughout to designate like parts, for a more detailed understanding of the invention, and in particular to Fig. 1 thereof, there is shown at 10 a pipe section having a number of rows of throttling orifices in the wall thereof, the rows preferably extending lengthwise of the section, three of the rows of orifices being shown at 11, 12, and 13. The aforementioned pipe section 10 has threaded ends 14 and 15. It should be noted that the rows of throttling orifices 11, 12 and 13 do not extend to the threaded ends, but that near the ends of the pipe section 10 there are solid portions 16 and 17 respectively, which are provided for purposes to be hereinafter more fully apparent.

The threaded ends 14 and 15 are provided for connecting the surge dampener device in circuit with a fluid line or conduit from which pulsations and surges are to be removed. Whereas for convenience of illustration only the embodiment of the invention is shown in which fluid flows through the pipe section 10 of the surge dampening apparatus, it should be understood that, if desired, one end, for example, end 15 of the pipe section 10 could be closed as by the use of a cap member, not shown, and the other end 14 connected to the fluid line for example by a T-joint.

A resilient sleeve 18 composed of rubber or other suitable resilient material encloses the perforated portion of the pipe section 10 and extends well beyond the perforated portion to substantially cover the aforementioned solid portions 16 and 17. As will be hereinafter more clearly apparent, the ends of the resilient sleeve extending over the solid portions of the pipe section provide means for sealing the apparatus against the flow of line fluid around the ends of the resilient sleeve.

Disposed around the outer side of the resilient sleeve 18 is a resilient shield which is preferably composed of two substantially semi-cylindrical resilient shield members designated 19 and 20, preferably formed of spring metal. It should be noted, Fig. 3, that the edges 21 and 22 of member 19 overlap with the edges 23 and 24 respectively of the member 20. It is desirable that the edges overlap to provide shielding for the resilient sleeve over the entire outer surface area of that portion of the sleeve 18 which encloses the perforated portion of pipe section 10, and further to provide that when the diameter of the sleeve 18 changes with changes in the fluid volume between the sleeve 18 and pipe section 10 resulting from changes in fluid pressure in the line, the edges of the shield members 19 and 20 are free to slide with respect to each other and maintain the positions of the shield members substantially adjacent to the outer surface of the resilient sleeve 18.

Preferably the edges 21 and 23, and 22 and 24, are tapered with respect to each other.

The semi-cylindrical shield member 19 has an end portion 25 which extends substantially to the adjacent end of the resilient sleeve 18, while the semi-cylindrical shield member 20 has an end portion 26 which extends to the adjacent end of the resilient sleeve 18.

Mounted upon the left-hand end of the apparatus, as viewed in Fig. 1, is a circular ring member 27 which is preferably composed of a material having some resiliency but which preferably does not have as much resiliency as the resilient sleeve 18. The circular or annular ring member 27, Fig. 4, has a portion of increased inner diameter designated 28 which extends only substantially half way around the inner periphery of the ring member. The portion of ring member 27 of smaller inner diameter encloses the end 25 of the aforementioned semi-cylindrical shield member 19. The portion 28 of increased inner diameter provides sufficient room for the adjacent end of the other semi-cylindrical shield member designated 20.

Mounted upon the other end of the resilient sleeve and enclosing the adjacent ends of semi-cylindrical members 19 and 20 is an annular ring member designated 29. Disposed around the outside of the resilient ring member 29 is a clamp member 30 which extends around the outside of the member 29 and has two extended arm portions, one being shown in Fig. 1 and designated 31, the arm portions having bores therein, one of the bores being shown at 32 in Fig. 1, for receiving a bolt 33. It should be noted that the resilient sleeve 18 has at the end thereof adjacent clamp 30 a small portion of slightly increased diameter, designated 34, this portion 34 of increased diameter being provided to snugly receive the adjacent end 26 of the semi-cylindrical member 20. The portion 34 extends only substantially half way around the outer periphery of the sleeve 18.

Disposed around the ring member 27 at the other or left-hand end of the apparatus as viewed in Fig. 1 is an additional clamp member 35, the clamp member 35 extending around the periphery of member 27 and having two arms, one of the arms being shown at 36 and having a bore 37 therein for receiving a clamping bolt 38. The other arm is designated 39, Fig. 4.

Disposed around the outsides of the two semi-cylindrical members 19 and 20 is a coiled helical spring 40, the helical spring being wound in the form of a helix around the aforementioned semi-cylindrical shield members, one end of the spring 40 being designated 41 and anchored to bolt 38, the other end of the helical spring 40 being designated 42 being anchored to aforementioned bolt 32.

In the operation of the above described apparatus, pulses of pressure in the fluid in pipe section 10 cause fluid to flow through the rows of throttling orifices including rows 11, 12, and 13 and to force the resilient sleeve 18 away from the outer surface of the pipe section 10, enlarging the volume between the sleeve 18 and the pipe section 10. As the sleeve moves away from the pipe section, the spring 40 stretches, increasing over at least a portion of the length of the sleeve the radius of the helix which the spring 40 forms about the outside of the resilient sleeve 18. At the same time, that is, while the resilient sleeve is expanding, the members 19 and 20 move outwardly with respect to each other, or away from each other, to permit the enlarged volume. The tension of spring 40 is increased, aiding the sleeve 18 in resisting further expansion and controlling the flow of fluid into the volume between it and the pipe section 10. The shield members 19 and 20 prevent the turns of the spring 40 from coming in contact with the outer surface of the resilient sleeve 18 and accordingly prevent the possibility of wear resulting from such contact. After the surge of pressure has past, the sleeve 18 and spring 40 together force the fluid back from the volume between the sleeve 18 and pipe section 10 through the orifices 11, 12 and 13 into the fluid line of the pipe section or conduit.

Whereas the invention is shown and described in connection with an embodiment thereof in which the perforated pipe section has four rows of throttling orifices therein, it is to be understood that any convenient number could be employed.

The ratio between the area of pipe section 10 and the total of the areas of all the throttling orifices may be that which is deemed most desirable, and the invention is not limited to any particular ratio. Moreover, any size or shape of throttling orifices may be employed as desired. Whereas the invention has been illustrated by the use of a helical spring having a substantially circular cross-section, the invention is not to be limited to the use of a spring of this type.

Having now described the invention, what I claim as new and desire to secure by Letters Patent, is:

1. Pulsation dampening apparatus for use with a conduit carrying a fluid under variable pressure, comprising, in combination, a pipe section for connecting to said conduit, said pipe section having a plurality of throttling orifices in the wall thereof, resilient sleeve means substantially enclosing the outer surface of said pipe section, spring means including a helical spring coiled around the outside of said sleeve means and applying pressure toward the outer surface of said sleeve means, and means interposed between said spring means and said sleeve means for preventing damage to said sleeve means by contact with said helical spring, said damage preventing means consisting of a pair of substantially semi-cylindrical shield members, the edges of said semi-cylindrical shield members overlapping with respect to each other.

2. A pulsation dampening apparatus for use with a conduit carrying a fluid under variable pressure, comprising, in combination, a pipe section for connection to said conduit, said pipe section having a plurality of throttling orifices in the walls thereof, resilient sleeve means substantially enclosing the outer surface of said pipe section, spring means disposed around the outside of said sleeve means and applying pressure toward the outer surface of said sleeve means, and resilient metallic shield means interposed between said resilient sleeve and said spring means for preventing damage to said sleeve means by contact with said spring means, said metallic shield means consisting of a pair of substantially semi-cylindrical shield members, the edges of said shield members overlapping with each other.

3. Pulsation dampening and surge absorbing apparatus for use with a conduit carrying a fluid under variable pressure, said apparatus comprising, in combination, a pipe section having a plurality of circumferentially spaced throttling orifices therethrough and connectable to said conduit, a resilient sleeve surrounding said pipe section, a helical spring coiled around the outside of said sleeve and applying pressure toward the outer surface of said sleeve, a pair of clamp members mounted respectively at opposite ends of said resilient sleeve, the opposite ends of said helical spring being secured respectively to said clamp members, and means interposed between said spring and said sleeve for preventing damage to said sleeve by contact with said helical spring, said means consisting of a pair of substantially semi-cylindrical shield members, the edges of said semi-cylindrical shield members overlapping with respect to each other.

References Cited in the file of this patent

UNITED STATES PATENTS

| | | |
|---|---|---|
| 1,852,897 | Price | Apr. 5, 1932 |
| 1,932,666 | Hyatt | Oct. 31, 1933 |
| 1,974,323 | Allen | Sept. 18, 1934 |
| 2,261,948 | Beach | Nov. 11, 1941 |
| 2,278,688 | Caminez | Apr. 7, 1942 |
| 2,495,693 | Byrd et al. | Jan. 1, 1950 |
| 2,664,049 | Coberly | Dec. 29, 1953 |